L. H. BRINKMAN.
POWER TRANSMITTER.
APPLICATION FILED FEB. 3, 1912.

1,152,001.

Patented Aug. 31, 1915.

WITNESSES:

INVENTOR.
Louis H. Brinkman
BY
William W. Varney
ATTORNEY.

UNITED STATES PATENT OFFICE.

LOUIS H. BRINKMAN, OF GLEN RIDGE, NEW JERSEY, ASSIGNOR TO GENERAL INDUSTRIES COMPANY, A CORPORATION OF NEW YORK.

POWER-TRANSMITTER.

1,152,001.   Specification of Letters Patent.   Patented Aug. 31, 1915.

Application filed February 3, 1912. Serial No. 675,376.

*To all whom it may concern:*

Be it known that I, LOUIS H. BRINKMAN, a citizen of the United States, residing at Glen Ridge, in the county of Essex and State of New Jersey, have invented a new and useful Power-Transmitter, of which the following is a specification.

My invention relates to improvements in power transmitters and more particularly to that class known as ball bearing worm gears.

One object of my invention is to provide a ball bearing worm gear in which several teeth or sets of balls operate simultaneously to transmit power in a most efficient manner and in which the different sets of balls may run at different speeds without interference, and with a minimum of resistance and friction.

Further objects, features and advantages will more clearly appear from the detailed description given below taken in connection with accompanying drawing which forms a part of this specification.

Figure 2:
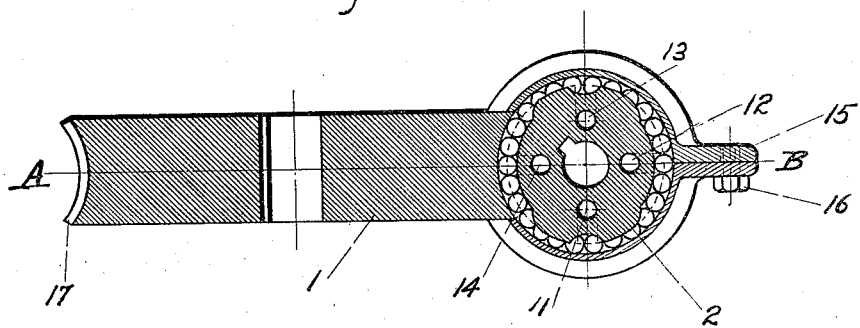
Figure 1:
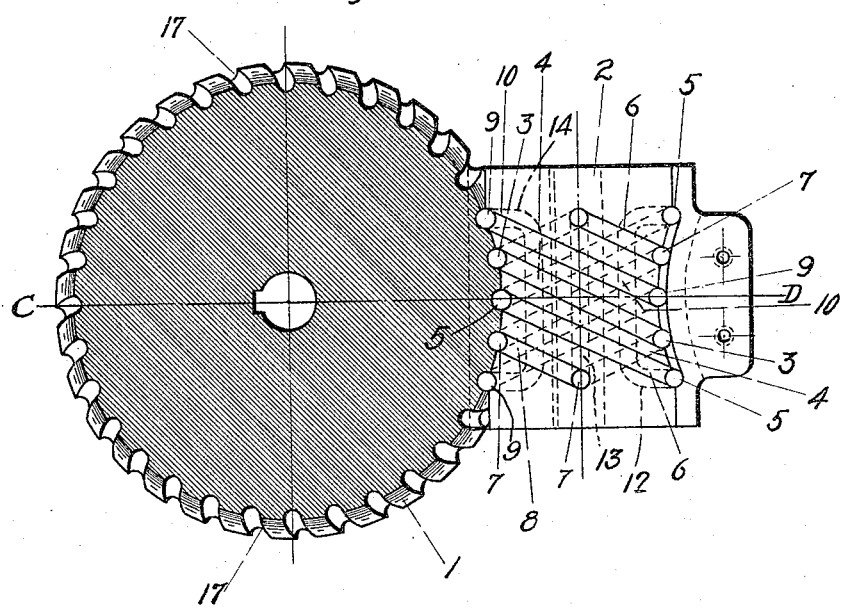

In the drawing Figure 1 is a side view of a worm gear embodying my invention in one form, the gear being taken in section along the line A—B of Fig. 2. Fig. 2 is a section taken along the line C—D of Fig. 1.

Referring to the drawings 1 represents the gear and 2 the worm. The worm and gear instead of being provided with the usual teeth are provided with mutually resistant balls 9, 3, 5, 7 and 9 which balls operate in grooves 17 in the face of the gear 1 and are carried in four separate grooves or raceways respectively on the worm 2. Thus the balls 9 are arranged to travel in a raceway 10 which extends in the form of a groove from the upper left-hand corner of the worm over the top of the worm spirally as shown by heavy lines to the center of the worm on the right-hand side, thence on the back side of the worm to the lower left-hand corner of the worm, as shown by dotted lines, thus passing exactly once around the worm whence the raceway passes into the worm and returns to the so-called starting point by the internal hole or return path 14. The balls 3 operate in a groove or raceway 4 which may be considered as starting at the upper left hand portion of the worm and extending over the top of the worm, one half way around the worm to the lower right hand portion, thence underneath or on the back side of the worm one-quarter way around, whence it passes up into the worm and returns to the other or upper end of the worm by hole or return path 11, whence the groove continues to the starting point one-quarter of the circumferential distance. It will thus be seen that the balls 3 travel once around the worm in covering the entire length of their raceway 4. The balls 5 operate in a groove or raceway 6 which is in all respects like the raceway 10 except that it is oppositely disposed on the worm and has its return passage through the worm at 12. The balls 7 operate in groove or raceway 8 which is in all respects like the raceway 4 except that it is oppositely disposed on the worm and has its return passage through the worm at 13. Each of the raceways is practically filled with balls although most have been omitted from Fig. 1 for the sake of clearness.

The worm 2 is of the hour glass type or shape, that is, its coacting surface is substantially parallel with and adjacent to the periphery of the gear, the object being to have the face of the worm curved to fit the gear, so that the gear and worm may have their adjacent operating faces substantially parallel and coincident. As is usual in worm gears the two coactive elements of the power transmitter revolve in different planes, in the present instance one being at right angles to the other. It will readily be seen that the balls in the grooves form relatively movable interposed anti-friction means mutually resistant with respect to the two elements of the worm gear, or in other words they form antifriction teeth whereby rotation of the worm will drive the gear. It will also be noted that the worm is provided with a plurality of independent grooves each groove having an independent set of balls, the balls of each set being arranged to be conveyed from one end of their respective groove to the other end thereof through an independent passageway in the worm. In order to properly retain the balls in the grooves on the worm a stationary two part casing 15 secured together by bolt 16 encompasses the worm, but is open at the part opposite the periphery of the gear 1 to allow the balls to operate in the grooves 17 thereof.

It will be seen that the operative balls 9 in groove 10 are at a greater distance from the axis of the worm than the operative balls 3 in groove 4, and the operative balls 3 in groove 4 are at a greater distance from the axis of the worm than the operative balls 5 in groove 7, etc., when the parts are in the positions shown in Fig. 1. Therefore the operating balls near the ends of the worm will travel at a greater speed than those near the center of the worm, due to the greater peripheral speed. If all the balls were in the same groove or one continuous raceway it will be seen that some would tend to move faster than others, thus causing jamming or binding and friction with consequent loss of power and greater wear and tear. But these disadvantages are overcome by my improved arrangement by having the balls arranged in independent sets in independent grooves so that each set of balls may travel at different speeds, according as its operating balls are at a greater or less distance from the axis of the worm, and at the same time the different sets of balls simultaneously engage both worm and gear so that the gear is driven from a plurality of points thus giving maximum contact. The passages 11, 12, 13 and 14 form an efficient means whereby endless paths are formed for each set of balls, so that when they reach the end of a groove at the end of the worm they are forced down into the connecting passage and through the same to the other end of the groove.

Although I have described my improvements in great detail and with respect to one particular embodiment, nevertheless I do not desire to be limited thereto except as clearly pointed out in the appended claims since many other adaptations and modifications may be made without departing from the spirit and scope of my invention in its broader aspects.

Having thus fully and clearly described my improvements what I claim as new and desire to secure by Letters Patent is:

1. A power transmitter consisting of two coactive elements revolving in different planes, the operating faces of which are substantially coincident, in combination with interposed relatively movable means mutually resistant.

2. The combination of a worm and its coöperating gear, having their adjacent operating faces substantially parallel, and interposed mutually resistant members relatively movable lineally with respect to the worm and the gear whereby rotation of the worm causes rotation of the gear.

3. The combination of a worm and its coöperating gear, having their adjacent operating faces substantially parallel and provided with coöperating grooves, and balls movable along said grooves forming antifriction teeth whereby rotation of the worm will drive the gear.

4. A power transmitter, consisting of a pair of coactive elements revolving in different planes, the operative faces of which are substantially coincident in combination with a plurality of mutually resistant balls interposed in substantially coincident grooves in said pair of elements, the parts being so formed that the balls are conveyed from one end of a groove to the other end thereof.

5. The combination of a worm and its coöperating gear, having their adjacent operating faces substantially parallel and provided with coöperating grooves, and antifriction balls in said grooves forming teeth whereby the rotation of the worm causes rotation of the gear, said worm having a hole therethrough through which the balls pass from one end of the worm to the other.

6. The combination of a worm and its coöperating gear, the worm being provided with a plurality of independent grooves and an independent set of balls in each groove acting as antifriction teeth for driving the gear, the parts being so formed that the balls of each set are independently conveyed from one end of their groove to the other end thereof and the operating faces of the worm and gear being substantially parallel.

7. A ball bearing worm and gear, the worm member having a plurality of independently movable sets of balls for teeth and also having its operative face curved to fit the periphery of the gear.

8. A ball bearing worm and gear, the worm member having for teeth a plurality of independently movable sets of balls, each set being movable lineally along separate paths, and also having its operative face curved to fit the periphery of the gear.

9. The combination of a worm and its coöperating gear, the operative face of the worm being curved to fit the gear and the worm being provided with a plurality of independent grooves, and an independent set of balls in each groove acting as teeth to drive the gear and arranged to travel in an endless path whereby the balls in different grooves may travel at different speeds.

10. The combination of a worm and its coöperating gear, the worm being provided with a plurality of independent grooves, and an independent set of balls in each groove acting as teeth to drive the gear and arranged to travel in an endless path whereby the balls in different grooves may travel at different speeds and the operating faces of the worm and gear being substantially parallel.

11. The combination of a worm and its coöperating gear, the worm being provided with a plurality of independent grooves, and an independent set of balls in each groove acting as teeth to drive the gear and the worm being provided with independent passages therein, one for each groove, so that the balls are arranged to travel in an endless path whereby the balls in different grooves may travel at different speeds and the operating faces of the worm and gear being substantially parallel.

12. The combination of a worm and its coöperating gear, the worm being provided with a plurality of independent grooves, and an independent set of balls in each groove acting as teeth to drive the gear and the worm being provided with independent passages therein, one for each groove, so that the balls are arranged to travel in an endless path whereby the balls in different grooves may travel at different speeds and the operating faces of the worm and gear being substantially parallel and means for keeping the balls in place on the worm.

13. The combination of a worm and its coöperating gear, the worm being provided with a plurality of independent raceways, each forming an endless path and a set of anti-friction balls therein acting as teeth to drive the gear, and the operating faces of the worm and gear being substantially parallel whereby the balls in different raceways may simultaneously contact with both worm and gear to drive the worm and the balls in different raceways may travel at different speeds.

LOUIS H. BRINKMAN.

Witnesses:
EDWARD P. REYNOLDS,
DAN'L F. REISENWEBER.

Copies of this patent may be obtained for five cents each, by addressing the "Commissioner of Patents, Washington, D. C."